US009558783B2

(12) United States Patent  (10) Patent No.: US 9,558,783 B2
Spivak et al.  (45) Date of Patent: Jan. 31, 2017

(54) SYSTEM AND METHOD FOR DISPLAYING TAPE DRIVE UTILIZATION AND PERFORMANCE DATA

(75) Inventors: Scott Spivak, Fort Collins, CO (US); Richard Bickers, Bristol (GB); Robert Hazel, Fort Collins, CO (US)

(73) Assignee: Hewlett Packard Enterprises Development LP, Houston, TX (US)

( * ) Notice: Subject to any disclaimer, the term of this patent is extended or adjusted under 35 U.S.C. 154(b) by 510 days.

(21) Appl. No.: 13/476,863

(22) Filed: May 21, 2012

(65) Prior Publication Data

US 2013/0311923 A1  Nov. 21, 2013

(51) Int. Cl.
*G11B 27/00* (2006.01)
*G11B 27/36* (2006.01)

(52) U.S. Cl.
CPC ............. *G11B 27/002* (2013.01); *G11B 27/36* (2013.01); *G11B 2220/415* (2013.01)

(58) Field of Classification Search
CPC .. G11B 27/36; G11B 27/002; G11B 2220/415
USPC ................................................ 715/771, 734
See application file for complete search history.

(56) References Cited

U.S. PATENT DOCUMENTS

| 5,325,324 | A  | * | 6/1994  | Rentzepis et al. ............ 365/127 |
| 7,219,300 | B2 |   | 5/2007  | Arguie et al. |
| 7,890,473 | B1 |   | 2/2011  | Wyett |
| 2004/0051731 | A1 | * | 3/2004  | Chang et al. ................. 345/734 |
| 2009/0150622 | A1 | * | 6/2009  | Allen et al. .................... 711/154 |
| 2009/0254645 | A1 | * | 10/2009 | Haustein et al. ............. 709/223 |
| 2010/0114672 | A1 | * | 5/2010  | Klaus et al. .................... 705/11 |
| 2010/0191936 | A1 | * | 7/2010  | Khatri et al. ................... 712/42 |
| 2012/0023429 | A1 |   | 1/2012  | Medhi |

OTHER PUBLICATIONS

"IBM Information Dynamic Server Performance Guide", IBM, Nov. 2, 2005.*
HP ESL G3 Tape Libraries, Overview, copyright 2012 HPDC, DA-14074 9-V 9—Apr. 6, 2012 http://h18000.www1.hp.com/products/quickspecs/14074_na/14074_na.html, 21 pages.

(Continued)

*Primary Examiner* — Li Sun
(74) *Attorney, Agent, or Firm* — Hewlett Packard Enterprise Development Patent Department

(57) ABSTRACT

A system includes a utilization calculation module, a performance calculation module, an input module and an output module. The input module to receive a user-selection of tape drives and time ranges over which to calculate utilization data and calculate performance data. The utilization module to calculate utilization data of the selected tape drives over the selected time ranges. The performance module to calculate performance data of the selected tape drives over the selected time ranges. The output module to generate single data points representing output of utilization data and performance data of the respective selected tape drives, and to analyze the data points to determine whether to highlight the data points in a first user-definable display region representing higher utilization and performance tape drives relative to data points in a second user-definable display region representing lower utilization and performance tape drives.

20 Claims, 4 Drawing Sheets

(56) References Cited

OTHER PUBLICATIONS

IBM Info Tape ID#4265,http://www-304.ibm.com/partnerworld/gsd/solutiondetails.do?solution=4265&expand=true&lc=en[5/18/2012 1:55:08 PM] 9 pages.

Meier, et al, Chapter 16—Performance Test Reporting Fundamentals, http://msdn.microsoft.com/en-us/library/bb924371.aspx[5/18/2012 1:copyright 2012 MS, 18 pages.

Crossroads Frequently Asked Questions; ReadVerify Appliance (RVA) 4.0; www.crossroads.com; 2012, 5 pages.

* cited by examiner

SYSTEM AND METHOD FOR DISPLAYING TAPE DRIVE UTILIZATION AND PERFORMANCE DATA

BACKGROUND

Tape storage systems may include tape drives that can write data to a tape medium and read data back from the tape medium. The tape drives may be prone to wear through use which may cause degradation in performance of the tape storage system.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
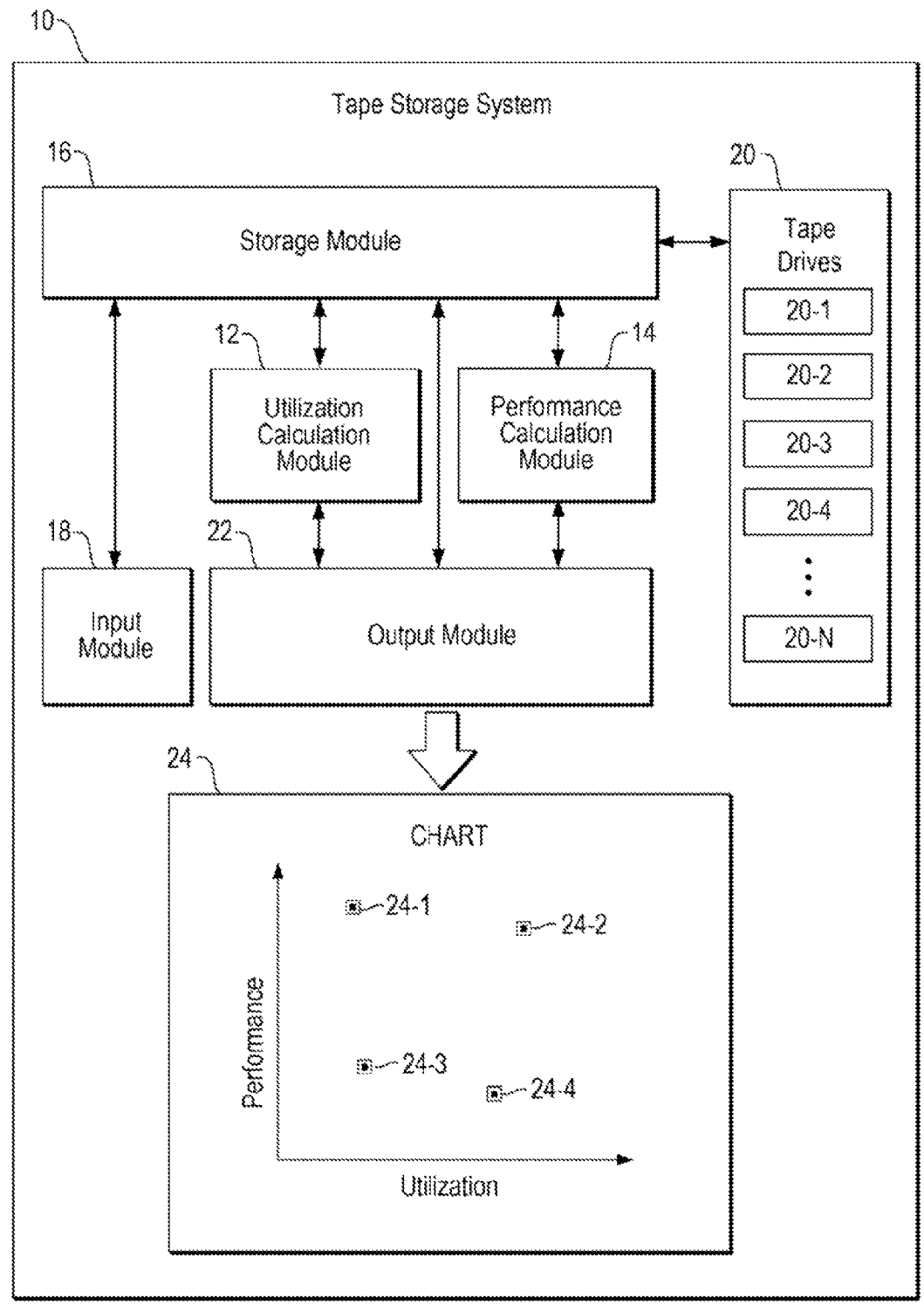
FIG. 1 is an example block diagram of a tape storage system in accordance with an example of the present application.

As explained above, tape storage systems may include tape drives that can write data to a tape medium and read data back from the tape medium. The tape drives may be prone to wear through use which may cause degradation in performance of the tape storage system. In addition, the tape drives may not be utilized in an efficient manner which can impact utilization of tape drives in the tape storage system. It may be important for a user to be able to assess the performance and utilization of the tape drives so to make decisions about how to improve the performance and utilization of the tape drives as part of the tape storage system.

The present application provides a user with information about the performance and utilization of tape drives of a tape storage system which can help the user to make decisions about how to improve the performance and utilization of the system. For example, the present application provides a tape storage system with the capability to calculate tape drive metric data, such as tape drive utilization data and performance data, and present this data to a user in a manner that can provide insight into the amount of value that is being obtained from the tape drives. For example, the techniques of the present application combine tape drive utilization data and tape drive performance data into single data points and present the data points on a display or chart in a manner to help provide a user with a quick and powerful summary of the value being provided by the tape storage resources.

The techniques of the present application can generate and analyze performance and utilization data of tape drives to provide a user with guidance on improving the performance and utilization of the tape drives as part of tape storage system. For example, a typical application for tape drives is a storage application to backup or archive data to tape drives as part of a tape backup system. A tape backup system may include an automated system comprising a tape library that includes an automated means to manage several tape drives and tape medium and to write data to the tape medium and read data back from the tape medium for tape backup purposes. In another example, the system may allow a user to specify the amount of storage to back up and the time range or backup window over which a tape backup operation can occur.

As mentioned above, the performance of tape drives may degrade over time which may have a negative impact on tape backup operations. In addition, the tape storage system may not be utilizing the tape drives in an efficient manner which may have a negative impact on tape backup operations. Furthermore, the tape drives may be transferring data to the tape medium at an actual transfer rate that is less than its expected performance capability. Therefore, the tape storage system may not be operating efficiently which may make it difficult to for the system to meet a backup window of a backup operation. In one example, the techniques of the present application can include calculation of tape drive metric data, such as tape drive utilization data and performance data, and present this data as single data points on a display to provide a user with the ability to assess the overall utilization and performance of the tape storage resources. In one example, the present techniques can provide a system that can analyze the utilization and performance data and make decisions about which data points of tape drives to highlight or identify as being high performance compared to data points of tape drives that are low performance.

In another example, to illustrate, the user can specify display regions to highlight particular utilization and performance data. For example, a user can specify a first display region which can represent higher performance and utilization tape drives and a second display region which can represent lower performance and utilization tape drives. A user can also specify further areas to highlight within the display regions by using for example particular color schemes or patterns. A user can also specify particular tape drives and time ranges over which such calculations can be performed. The system can calculate performance and utilization data of the user-specified tape drives over the user-specified time ranges.

In one example, the system can combine the performance and utilization data as single data points for display to a user. The system can analyze the data points to determine which data points to highlight in the first display region representing higher utilization and performance tape drives relative to data points in the second display region as representing lower utilization and performance tape drives. In this case, data points highlighted in the first display region may indicate that these tape drives are high performance and high utilization. If the backup window is not being met, then this information can provide a user or system administrator with the necessary support or tools to make a decision about which tape drives are performing at their capacity but not meeting backup requirements. The user may then decide that it may be necessary to increase or purchase additional tape storage resources to met backup requirements. On the other hand, data points highlighted in the second display region may suggest that these tape drives are low performance and low utilization. In this case, if the backup window is not being met, then this may suggest that there may be some data path issues that may need to be resolved or that the backup schedule may need to be adjusted to more evenly balance the load among the storage resources.

FIG. 1 is an example block diagram of a tape storage system 10 according an example of the techniques of the present application. The tape storage system 10 generates and analyzes utilization and performance data of tape drives 20 to help allow a user to make decisions regarding how to improve the overall utilization and performance of the tape system, as explained below in further detail.

The tape system 10 includes a utilization calculation module 12 which can calculate utilization data of tape drives 20. In one example, utilization data can be defined as an amount of time that tape drives 20 are used for processing data during time ranges that the tape drives are used. In one example, the amount of time processing can include the time that tape system 10 exchanges data with tape drives 20 such as when the system writes data to the tape drives and reads data back from the tape drives. In one example, utilization calculation module 12 can calculate utilization data of selected tape drives over selected time ranges. To help facilitate this functionality, tape system 10 includes an input module 18 which can receive a user-selection of tape drives and time ranges over which to calculate utilization data. For example, to illustrate, a user can specify that utilization calculation module 12 calculate utilization data of a particular tape drive, such as tape drive 20-2, over a selected time range such as between 6 PM and 12 PM on Saturday as part of a tape backup window of a tape backup process. A tape backup window may be defined as a time range over which a tape backup process is scheduled to occur. In one example, to illustrate, the utilization data may reveal that tape 20-2 was used for 4 hours during the 6 hour time range (6 PM and 12 PM) which results in tape drive utilization of 66%=(4 hour use)/(6 hour time range). This utilization data metric indicates that tape drive 20-2 was used about 66% of the time and that it was not used for the other 34% of the time which may suggest that the system can increase the use of the tape drive if necessary to meet a particular backup window.

The tape system 10 includes a performance calculation module 14 to calculate performance data of tape drives 20. In one example, performance data can be defined as an average transfer rate of data transferred to the tape drives during the time ranges that the tape drives are used and divided by a maximum stated transfer rate of the tape drives. In one example, performance calculation module 14 can calculate performance data of selected tape drives over selected time ranges. The input module 18 can receive a user-selection of tape drives of tape storage system 10 and time ranges over which to calculate performance data. For example, to illustrate, a user can specify performance calculation module 14 to calculate performance data of a particular tape drive, such as tape drive 20-2, over a selected time range such as between 6 PM and 12 PM on Saturday as part of a tape backup window of a tape backup process. In one example, to illustrate, the performance data may reveal that tape 20-2 transferred data at an actual transfer rate of 70 Megabyte (MB)/sec during the 6 hour time range (6 PM and 12 PM). This actual transfer rate of 70 MB/sec is then divided by a maximum stated transfer rate of 100 MB/sec of the tape drive according to its stated performance capability. This data indicates that tape drive 20-2 exhibits a performance metric of 70%=70/100. This data metric indicates that tape drive 20-2 transferred data at about 70% of its expected performance capability which may suggest that the data rate of the source data may be limiting the usage of the tape system and greater usage may be available if the source data rate can be increased.

The tape storage system 10 includes an output module 22 which provides an output interface to present information or data to a user or data administrator of the system. In one example, output module 22 can generate single data points based on a combination of utilization data and performance data of the respective selected tape drives over the selected time ranges. For example, display 24 shows four data points 24-1 through 24-4 which represent single data points of utilization and performance data of respective tape drives 20-1 through 20-4. To illustrate, continuing with the above example, tape system 10 determined that tape drive 20-2 had a performance metric of 70% and a utilization metric of 66% and the system plotted this metric data as single data point 24-2 as shown in display 24.

The output module 22 can analyze the data points to determine whether to highlight these data points in a manner that may be meaningful to a user. In one example, output module 22 can generate an output in the form of a chart or display such as shown by display 24. In this example, utilization data is plotted along the x axis while performance data is plotted along the y axis. As explained below in further detail, output module 22 can allow a user to define display regions of display 24 to highlight different utilization and performance data ranges. In another example, output module 22 can allow a user to further highlight the data points within the display regions by using, for example, one color, such as green, to emphasize high performance tape drives and another color, such as red, to emphasize low performance tape drives. In this way, the system can allow a user to quickly identify and distinguish between high performance tape drives and low performance tape drives for assessing the performance of the system.

The output module 22 has been described above as providing a display 24 to display data points. However, it should be understood that output module 22 can be provide any means of communicating information or data to a user. For example, output module 22 can provide graphical output in the form of a display screen, audio output in the form of audio sound, printer output using paper medium to generate a paper report and the like or a combination thereof.

The input module 18 provides an input interface to allow tape storage system 10 to receive user information or data. For example, as explained above, input module 18 can provide a user with the ability to input a user-selection of tape drives and input user-specified time ranges over which to calculate utilization data and performance data. The input module 18 can include any means of allowing a user to input information and data to tape storage system 10. For example, input module 18 can provide a graphical user interface (GUI), a command line interface (CLI), a voice response interface, a touch screen response interface and the like or a combination thereof to implement this functionality.

A storage module 16 provides functionality to facilitate communicate tape drives 20 or other storage resources. The tape drives 20 can receive tape cartridges supporting tape medium and then the tape drives can write data to the tape medium and read data back from the tape medium. The storage module 16 can collect and store performance and utilization data about tape drives 20 in the form of a database of historical data. The storage module 16 can retrieve this historical data from the database and forward it to utilization calculation module 12 and performance calculation module 14 for use in its calculation operations.

The tape storage system 10 can be any computing device capable of processing data to perform the functionality as describe herein. The functionality of tape storage system 10 can be implemented in hardware, software or a combination thereof. For example, tape storage system 10 can include a memory device for storing processor executable instructions to implement the functionality of the present application and a processor to execute these instructions.

The tape storage system 10 is shown as having a plurality of tape drives 20. However, it should be understood that any number of tape drives can be employed to practice the techniques of the present application. The tape drives 20 can be electro-mechanical devices that can receive tape cartridges. The tape cartridges can be enclosures that support tape medium which can store data for subsequent retrieval. The tape drives can read data from and write data to the tape medium in a sequential manner. In another example, tape storage system 10 can be a tape library supporting a plurality of tape drives and tape cartridges. The tape library may include a computer controlled robot mechanism to select and couple particular tape cartridges to particular tape drives and then the tape drives can write data to and read data back from the tape cartridges. The tape library can be used for data backup storage purposes, archive storage purposes or other purposes.

The tape storage system 10 has been described in the context of a system having a plurality of modules that interact with each other such as storage module 16, etc. This configuration is for illustrative purposes. It should be understood that other configurations may be possible to implement the techniques of the present application. For example, some of the functionality described herein can be implemented in one module to replace the functionality provided by several modules. For example, one module can provide functionality of a combination of output module 22, utilization calculation module 12 and performance calculation module 14. Further, some of the functionality described herein that is implemented by one module can be performed by another module and the like.

The techniques of the present application have been described in the context of a tape storage system. However, the techniques of the present application may be applicable to other storage resource technologies such as optical disk drive storage, spinning disk drive storage and the like. The tape storage system 10 is shown as a single system that includes several modules. However, it should be understood that the modules can be located in a single system enclosure, a system of several enclosures, a system of modules distributed across remote geographical locations such as across different rooms, office building sites, states, countries and the like or a combination thereof. The modules of tape storage system 10 can communicate with each other using any electronic communication means such as bus technology, wired technology, wireless technology, local area network (LAN) technology, wide area network (WAN) technology and the like.

Figure 2:
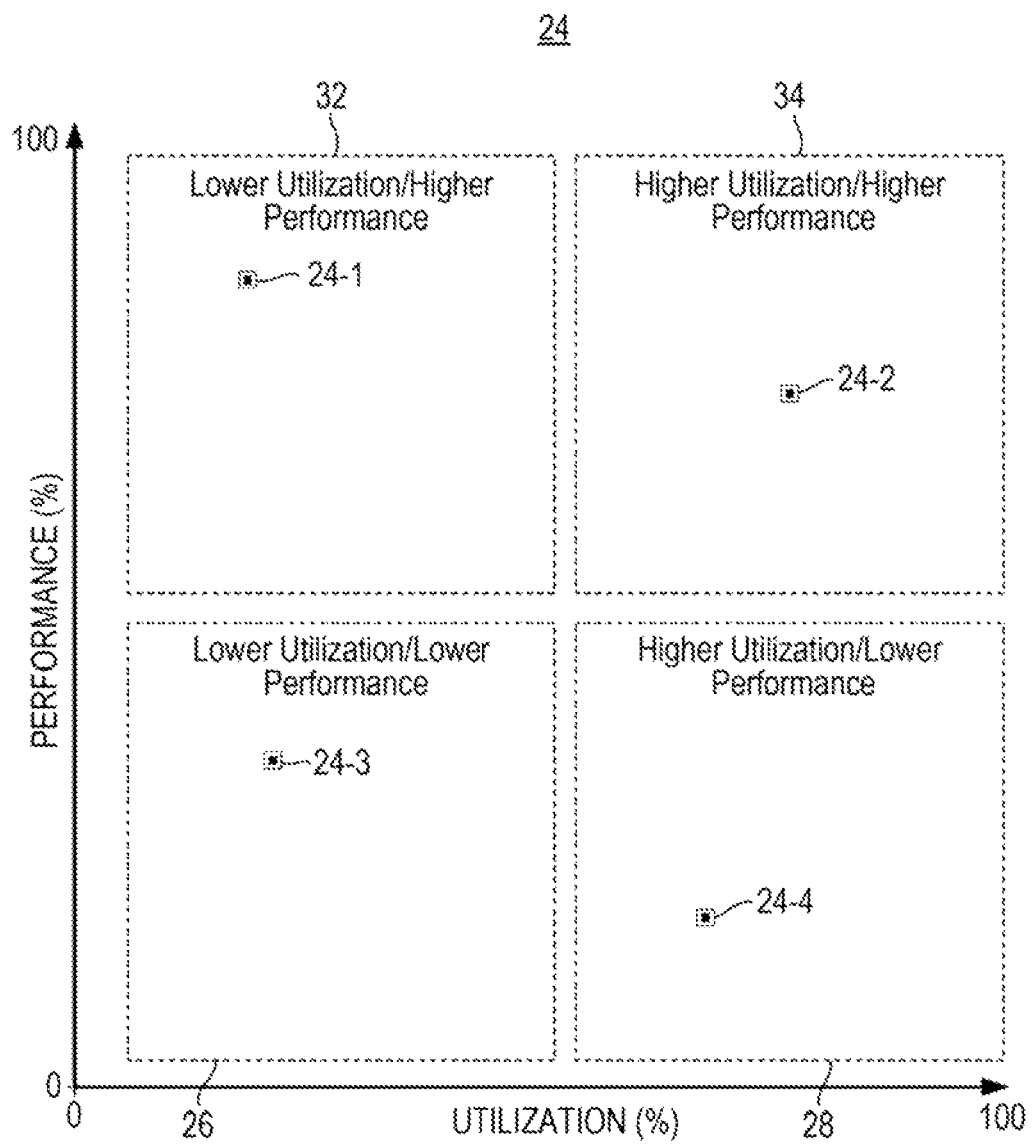
FIG. 2 is an example chart to display tape drive utilization and performance data in accordance with an example of the present application.

FIG. 2 is an example chart or display to display tape drive utilization and performance data in accordance with an example of the present application. In one example, tape storage system 10 can provide display 24 with a variety of user-definable display features. As explained above, utilization calculation module 12 and performance calculation module 14 can generate data for selected tape drives over selected time ranges. The output module 22 can generate data points from the data and analyze these data points to determine in the manner in which to highlight the data points to provide meaningful information to a user. The output module 22 can display data points representing a combination of utilization data and performance data of respective selected tape drives over the selected time ranges. For example, display 24 shows four data points 24-1 through 24-4 which represent a combination of utilization and performance data of respective tape drives 20-1 through 20-4.

The output module 22 can allow a user to define different display regions of display 24 to highlight particular utilization and performance data ranges. The output module 22 may allow a user to specify how to highlight one display region in manner that is different than another display region. For example, display 24 shown in FIG. 2 presents a display in the form of a quadrant of four display regions 26, 28, 32 and 34. To illustrate, display region 34 can be specified as a region to display data points having values greater than 50% utilization and performance. In another example, output module 22 can allow a user to further highlight the data points within the display regions by using, for example, one color, such as green, to emphasize high performance tape drives and another color, such as red, to emphasize low performance tape drives. In this way, the system can allow a user to quickly identify and distinguish between high performance tape drives and low performance tape drives for assessing the performance of the system. It should be understood that this is an example display configuration shown for illustrative purposes and that different configurations are possible such as a display having a different number of display regions and the like.

Figure 3:
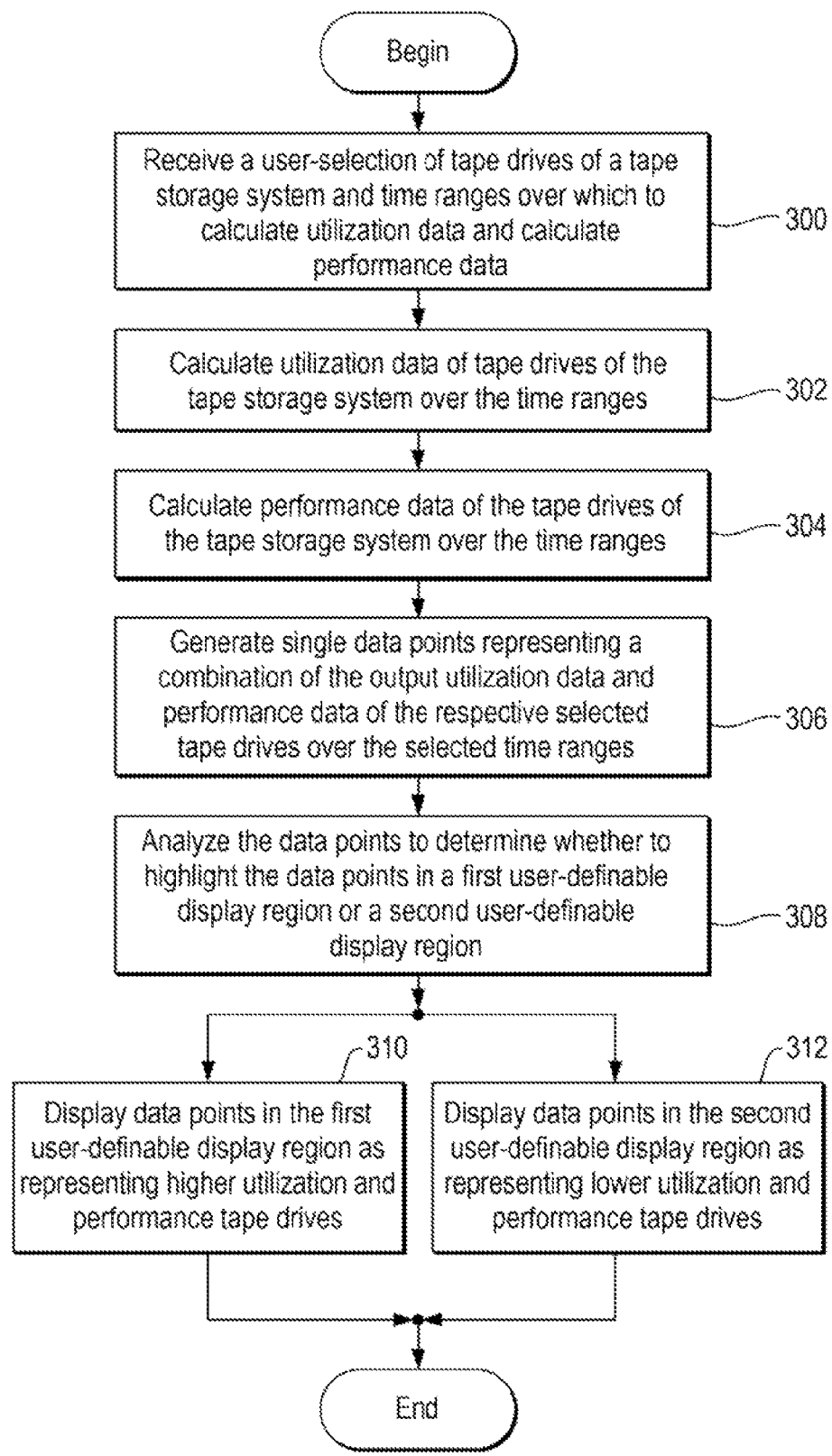
FIG. 3 is an example flow diagram for generating tape drive utilization and performance data in accordance with an example of the present application.

FIG. 3 is an example flow diagram for generating tape drive utilization and performance data in accordance with an example of the present application.

At block 300, tape storage system 10 receives user input to specify the operation of the tape storage system. In one example, input module 18 can receive a user-selection of tape drives and time ranges over which to calculate utilization data and calculate performance data. To illustrate, it can be assumed that a user is interested in assessing the performance of two tape drives 20-2 and 20-3 as part of a backup window that occurs during a time range between 6 PM and 12 PM on Saturday. In addition, the user specifies two display regions 26 and 34 to display data points for tape storage system 10. The input module 18 can provide a GUI to allow the user to enter the user-defined information including the selected tape drives, time range and display regions.

At block 302, tape storage system 10 calculates utilization data for tape drives of the tape storage system. In one example, utilization calculation module 12 calculates utilization data of the selected tape drives over the selected time ranges. Continuing with the above example, utilization calculation module 12 calculates utilization data for the two user-selected two tape drives 20-2 and 20-3 as part of a backup window that occurs during the user-selected time range between 6 PM and 12 PM on Saturday. To illustrate, it can be assumed that tape system 10 determined that tape drive 20-2 has a utilization of 66% and that tape drive 20-3 has a utilization of 20%.

At block 304, tape storage system 10 calculates performance data for tape drives of the tape storage system. In one example, performance calculation module 14 calculates performance data of the selected tape drives over the selected time ranges. Continuing with the above example, performance calculation module 14 calculates performance data for the two user-selected tape drives 20-2 and 20-3 as part of a backup window that occurs during the user-selected time range between 6 PM and 12 PM on Saturday. To illustrate, it can be assumed that tape system 10 determined that tape drive 20-2 has a performance of 66% and that tape drive 20-3 has a performance of 20%.

At block 306, tape storage system 10 generates data representing a combination of the output of utilization data and performance data. In one example, output module 22 generates single data points representing a combination of the output of utilization data and performance data of the respective selected tape drives over the selected time ranges.

Continuing with the above example, output module 22 generates two data points 24-2 and 24-3 for respective tape drives 20-2 and 20-3 as part of a backup window that occurs during a time range between 6 PM and 12 PM on Saturday. To illustrate, continuing with the above example, tape system 10 determined that tape drive 20-2 has a utilization of 66% and a performance of 66% which results in data point of 24-2. In a similar manner, tape system 10 determined that tape drive 20-3 has a utilization of 20% and a performance of 20% which results in data point of 24-3.

At block 308, tape storage system 100 analyzes the data points to determine whether to highlight the data points in the two display regions 26 and 34. In one example, output module 22 analyzes the data points to determine which of the two display regions to plot the data points.

At block 310, tape storage system 10 displays data points in first display region 34. The first display region 34 is intended to represent data points of tape drives that exhibit higher utilization and higher performance relative to other tape drives of tape storage system 10. Continuing with the above example, first display region 34 shows data point 24-2 which corresponds to tape drive 20-2 of tape storage system 10. In this case, output module 22 determined that tape drive 20-2 exhibited higher utilization and higher performance relative to other drives and highlighted data point 24-2 in this region.

At block 312, tape storage system 10 displays data points in second display region 26. The second display region 26 is meant to represent data points of tape drives that exhibit lower utilization and performance relative to other tape drives of tape storage system 10. Continuing with the above example, second display region 26 shows data point 24-3 which corresponds to tape drive 20-3 of tape storage system 10. In this case, output module 22 determined that tape drive 20-3 exhibited lower utilization and lower performance relative to other drives and highlighted data point 24-3 in this region.

In this manner, if a backup window of a backup schedule is not being met, then a use can analyze the display 24 to assess how to improve performance and utilization to attempt to meet the backup window. Continuing with the above example, data point 24-2 is highlighted in first display region 34 which indicates that tape drive 20-2 is a relatively high utilization and performance tape drive and thus there may be a need to increase storage of the tape storage system to help meet the backup window. In addition, data point 24-3 is highlighted in second display region 26 which indicates that tape drive 20-3 is a relatively low utilization and performance tape drive and thus there may be a need to adjust a backup schedule of the tape storage system to help meet a backup window.

The above example was described in the context of two display regions for illustrative purposes. However, the techniques of the present application allow a user to define different configurations of the display such as a display with a different number of display regions and the like. For example, a user can define four display regions. To illustrate, in addition to first display region 34 and second display region 26 described above, a user can specify a third display region 32 and a fourth display region 28. The third display region 32 may represent data points for tape drives that exhibit lower utilization and higher performance relative to other tape drives. To illustrate, third display region 32 shows data point 24-1 which corresponds to tape drive 20-1 of tape storage system 10. In this case, output module 22 determined that tape drive 20-1 exhibited lower utilization and higher performance relative to other drives and highlighted data point 24-1 in this region. Continuing with this example, fourth display region 28 may represent data points for tape drives that exhibit higher utilization and lower performance relative to other tape drives. The fourth display region 28 shows data point 24-4 which corresponds to tape drive 20-4 of tape storage system 10. In this case, output module 22 determined that tape drive 20-4 exhibited higher utilization and lower performance relative to other drives and highlighted data point 24-4 in this region.

It should be understood that the method described above is for illustrative purposes and that other configurations are possible to implement the techniques of the present application. For example, a different number of tape drives, display regions and time ranges may used to employ the techniques of the present application. In addition, the order in which processing was described with respect to the above processing blocks is only one example and a different order can be employed to implement the techniques of the present application. For example, block 304 may be performed before block 302 to implement the techniques of the present application.

Figure 4:
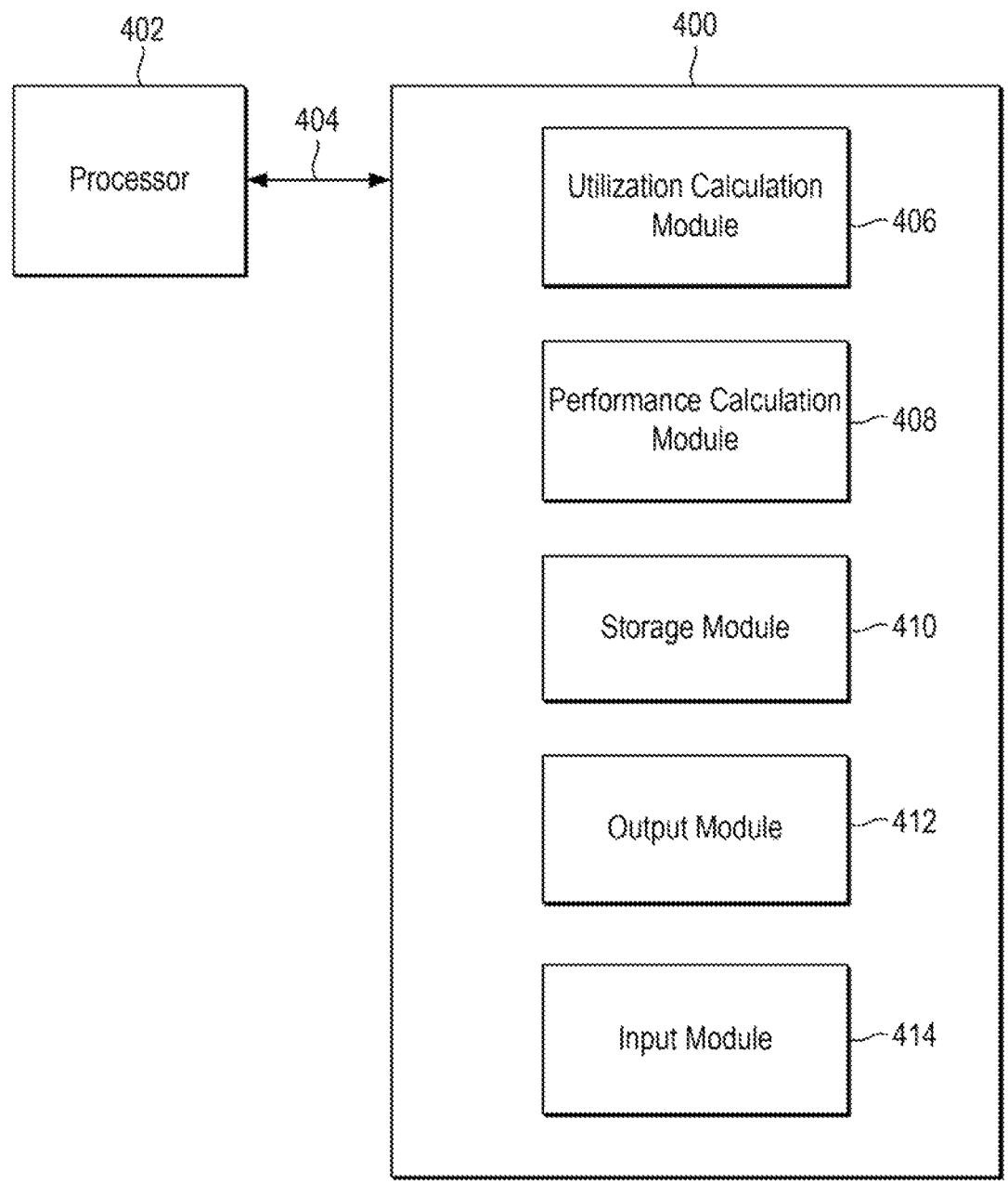
FIG. 4 is an example block diagram showing a non-transitory, computer-readable medium that stores instructions for a tape storage system in accordance with an example of the present application.

FIG. 4 is an example block diagram showing a non-transitory, computer-readable medium that stores code for employing the techniques of the present application. The non-transitory, computer-readable medium is generally referred to by the reference number 400 and may be included in tape storage system 10 as described in relation to FIG. 1. The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 402 generally retrieves and executes the instructions stored in the non-transitory, computer-readable medium 400 to perform the techniques of the present application in accordance with an example. In an example, the tangible, machine-readable medium 400 can be accessed by the processor 402 over a bus 404. A first region 406 of the non-transitory, computer-readable medium 400 may include functionality of utilization calculation module 12 as described herein. A second region 408 of the non-transitory, computer-readable medium 400 may include functionality of performance calculation module 14 as described herein. A third region 410 of the non-transitory, computer-readable medium 400 may include functionality of storage module 16 as described herein. A fourth region 412 of the non-transitory, computer-readable medium 400 may include functionality of output module 22 as described herein. A fifth region 414 of the non-transitory, computer-readable medium 400 may include functionality of input module 18 as described herein.

Although shown as contiguous blocks, the software components can be stored in any order or configuration. For example, if the non-transitory, computer-readable medium 400 is a hard drive, the software components can be stored in non-contiguous, or even overlapping, sectors.

What is claimed is:

1. A tape storage system, comprising:
a hardware processor; and
at least one module executable on the hardware processor to:
receive a user-selection of tape drives of a tape storage system and time ranges over which to calculate tape drive utilization metrics and tape drive performance metrics;
calculate tape drive utilization metrics of the selected tape drives over the selected time ranges, wherein the tape drive utilization metric of each tape drive is based on an amount of time that the tape drive is in use during the selected time ranges;
calculate tape drive performance metrics of the selected tape drives over the selected time ranges, wherein the tape drive performance metric of each tape drive is based on a data transfer rate of the tape drive during the selected time ranges;
generate single data points representing a combination of the tape drive utilization metrics and the tape drive performance metrics of the respective selected tape drives over the selected time ranges; and
analyze the data points to determine whether to highlight the data points in a first user-definable display region as representing higher utilization and performance tape drives relative to data points in a second user-definable display region as representing lower utilization and performance tape drives.

2. The tape storage system of claim 1, wherein the tape drive utilization metric of each tape drive is calculated as a percentage of time that the tape drive is used for processing data during the selected time ranges.

3. The tape storage system of claim 1, wherein the tape drive performance metric of each tape drive is calculated as an average transfer rate of data transferred to the tape drive during the selected time ranges and divided by a maximum stated transfer rate of the tape drive.

4. The tape storage system of claim 1, wherein the data points are plotted in a graph having an x-axis representing the tape drive utilization metrics and a y-axis representing the tape drive performance metrics.

5. The tape storage system of claim 1, wherein the at least one module is to determine whether to highlight the data points in a third user-definable display region as representing lower utilization and higher performance tape drives relative to data points in a fourth user-definable display region as representing higher utilization and lower performance tape drives.

6. The tape storage system of claim 1, further comprising a storage module to exchange data with the tape drives.

7. The tape storage system of claim 1, wherein data points highlighted in the first user-definable display region indicates a need to increase storage of the tape storage system and data points highlighted in the second user-definable display region indicates a need to adjust a backup schedule of the tape storage system.

8. A method, comprising:
receiving a user-selection of tape drives of a tape storage system and time ranges over which to calculate tape drive utilization metrics and tape drive performance metrics;
calculating, using a utilization calculation module, tape drive utilization metrics of the selected tape drives over the selected time ranges, wherein the tape drive utilization metric of each tape drive is based on an amount of time that the tape drive is in use during the selected time ranges;
calculating, using a performance calculation module, tape drive performance metrics of the selected tape drives over the selected time ranges, wherein the tape drive performance metric of each tape drive is based on a data transfer rate of the tape drive during the selected time ranges;
generating single data points representing a combination of the tape drive utilization metrics and the tape drive performance metrics of the respective selected tape drives over the selected time ranges; and
determining whether to highlight the data points in a first user-definable display region as representing higher utilization and performance tape drives relative to data points in a second user-definable display region as representing lower utilization and performance tape drives.

9. The method of claim 8, wherein the tape drive utilization metric of each tape drive is calculated as a percentage of time that the tape drive is used for processing data during the selected time ranges.

10. The method of claim 8, wherein the tape drive performance metric of each tape drive is calculated as an average transfer rate of data transferred to tape drive during the selected time ranges and divided by a maximum stated transfer rate of the tape drive.

11. The method of claim 8, further comprising plotting the data points in a graph having an x-axis representing the utilization metrics of the selected tape drives and a y-axis representing the performance metrics of the selected tape drives.

12. The method of claim 8, further comprising determining whether to highlight the data points in a third user-definable display region as representing lower utilization and higher performance tape drives relative to data points in a fourth user-definable display region as representing higher utilization and lower performance tape drives.

13. The method of claim 8, further comprising exchanging data with the tape drives.

14. The method of claim 8, wherein data points highlighted in the first user-definable display region indicates a need to increase storage of the tape storage system and data points highlighted in the second user-definable display region indicates a need to adjust a backup schedule of the tape storage system.

15. A non-transitory computer-readable medium having computer executable instructions stored thereon, the instructions are executable by a processor to:
receive a user-selection of tape drives of a tape storage system and time ranges over which to calculate tape drive utilization metrics and tape drive performance metrics;
calculate tape drive utilization metrics of the selected tape drives over the selected time ranges, wherein the tape drive utilization metric of each tape drive is based on an amount of time that the tape drive is in use during the selected time ranges;
calculate tape drive performance metrics of the selected tape drives over the selected time ranges, wherein the tape drive performance metric of each tape drive is based on a data transfer rate of the tape drive during the selected time ranges;
generate single data points representing a combination of the tape drive utilization metrics and the tape drive performance metrics of the respective selected tape drives over the selected time ranges, and to analyze the data points; and determine whether to highlight the data points in a first user-definable display region as representing higher utilization and performance tape drives relative to data points in a second user-definable display region as representing lower utilization and performance tape drives.

16. The non-transitory computer readable medium of claim 15 further comprising instructions that if executed cause a processor to: calculate the tape drive utilization metric of each tape drive as a percentage of time that the tape drive is used for processing data during a predetermined period of time.

17. The non-transitory computer readable medium of claim 15 further comprising instructions that if executed cause a processor to: calculate the tape drive performance metric of each tape drive as an average transfer rate of data transferred to the tape drive during a predetermined period of time and divided by a maximum stated transfer rate of the tape drive.

18. The non-transitory computer readable medium of claim 15, wherein the data points are plotted in a graph having an x-axis representing the utilization metrics of the selected tape drives and a y-axis representing the performance metrics of the selected tape drives.

19. The non-transitory computer readable medium of claim 15 further comprising instructions that if executed cause a processor to: allow a user to specify how to highlight the first user-definable display region in different manner than the second user-definable display region.

20. The non-transitory computer readable medium of claim 15 further comprising instructions that if executed cause a processor to: write data to and read data from the tape drives.

* * * * *